C. SIRCH.
SPRING SCALE.
APPLICATION FILED MAY 1, 1908.

902,769.

Patented Nov. 3, 1908.

WITNESSES
Arthur E. Jumper
August Miner

INVENTOR
Charles Sirch
BY
Frank R. Friesen
ATTORNEY

UNITED STATES PATENT OFFICE.

CHARLES SIRCH, OF NEW YORK, N. Y., ASSIGNOR OF ONE-HALF TO HERMAN ZILLICH, OF NEW YORK, N. Y.

SPRING-SCALE.

No. 902,769.  Specification of Letters Patent.  Patented Nov. 3, 1908.

Application filed May 1, 1908. Serial No. 430,266.

*To all whom it may concern:*

Be it known that I, CHARLES SIRCH, a citizen of the United States, residing at New York city, Manhattan, county and State of New York, have invented new and useful Improvements in Spring-Scales, of which the following is a specification.

This invention relates to a spring scale of novel construction, and more particularly to improved means for adjusting the pointer so that it will return accurately to the zero mark when the scale is unloaded.

Figure 1:
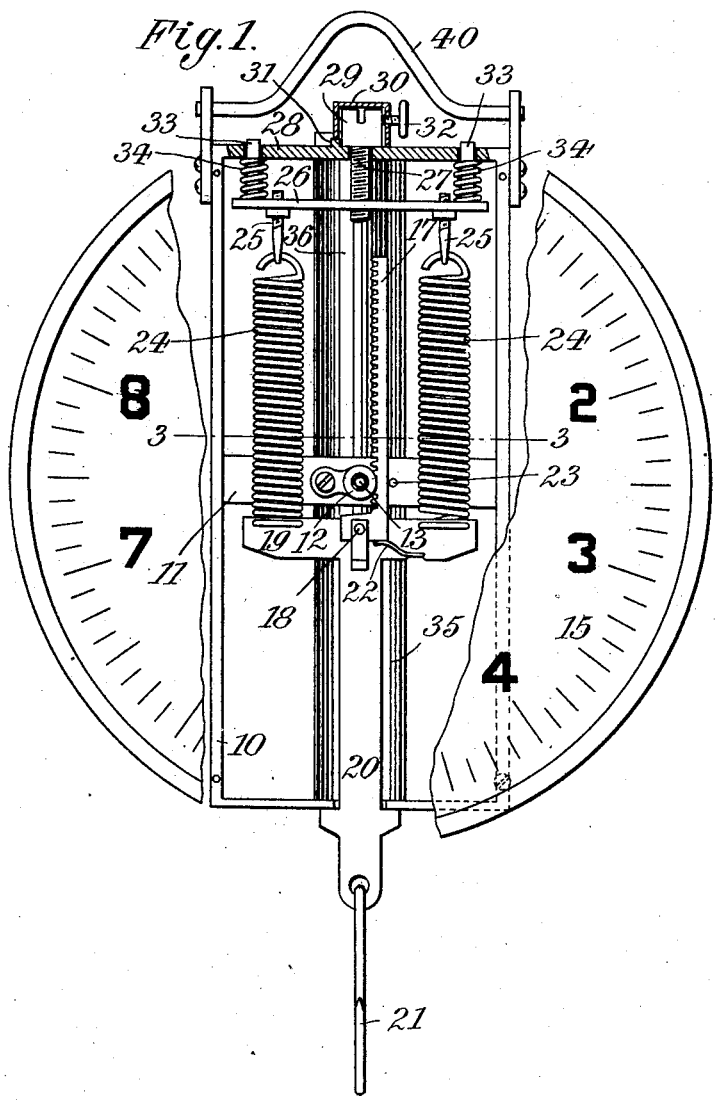
Figure 2:
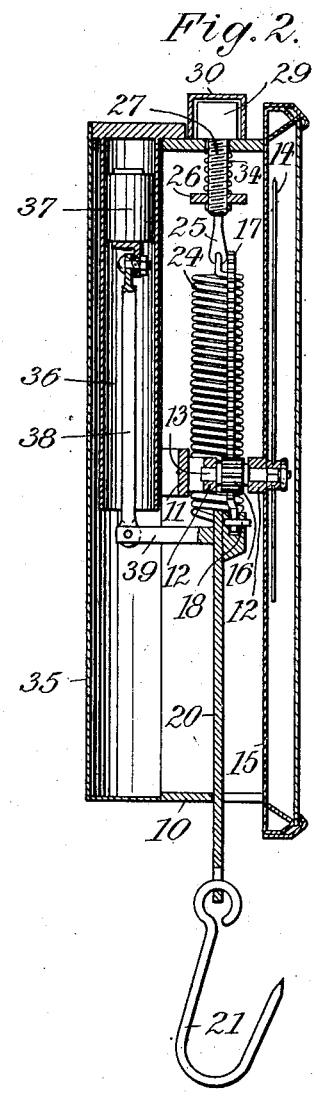
Figure 3:
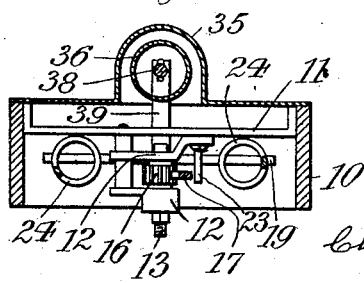

In the accompanying drawing: Figure 1 is a front view, partly in section, of my improved spring scale; Fig. 2 a vertical central section thereof, and Fig. 3 a cross section on line 3—3, Fig. 1.

The housing 10 of the scale is provided with a transverse bar 11 upon which are mounted the bearings 12 of arbor 13 carrying the pointer 14 which moves in front of dial 15, as usual. On arbor 13 is fast a pinion 16 engaged by a rack 17 pivoted at 18 to the cross-head 19 of runner 20. This runner is provided with a hook or other device 21 for suspending the load to be weighed. A spring 22 on cross-head 19, coöperating with a pin 23 on bar 11, serves to hold the rack 17 in operative engagement with pinion 16. To cross-head 19 are secured the lower ends of a pair of balancing springs 24, the upper ends of which are hooked into perforated lugs 25 depending from a vertically adjustable slide 26. This slide is centrally engaged by a screw 27 passing loosely through the top plate 28 of housing 10, and provided with a head 29 resting upon such plate. Head 29 is inclosed within a removable cap 30 held against rotation by being slotted at its bottom, to straddle a projection 31 of plate 28. A clamp-screw 32 tapped into cap 30 bears against head 29 and thus prevents screw 27 from turning.

From the top of slide 26 extend, upwardly, a pair of guide pins 33 passing freely through openings of top plate 28. These pins are encompassed by coiled springs 34 interposed between slide 26 and plate 28, and serving to maintain the slide in a horizontal position. Although balancing springs 24 tend, in part, to produce a similar effect, their action is reduced to a minimum when the scale is empty, as the springs 24 are then almost without tension, while the tension of springs 34 is constant.

If the pointer of the empty scale should be deflected from the zero mark, owing to variations in temperature, etc., it may be readily re-set by removing cap 30 and manipulating screw 27, until the desired re-adjustment has been accomplished.

To provide a pneumatic brake for the scale, the back plate of casing 10 is made with a central upright bulge or vertical hollow rib 35 adapted to accommodate a cylinder 36. This cylinder is secured to casing 10 in suitable manner and contains a plunger 37 which is operatively connected by link 38 to an arm 39 of runner 20. Rib 35, besides accommodating cylinder 36, has the additional function of constituting a grip or handle for the scale, the latter being normally suspended by a bail 40.

It will be seen that my improved scale is steady in operation, that it may be readily re-set whenever required, and that it will not be liable to loose its adjustment after being re-set.

I claim:

1. A spring scale provided with a housing, a slide, guide pins on the slide engaging the housing, springs mounted on the pins between housing and slide, means for adjusting the slide, a runner, and balancing springs connecting the slide to the runner, substantially as specified.

2. A spring scale provided with a housing, a screw having a head supported thereon, a slide engaged by the screw, a removable cap surrounding the head, means for holding said cap against rotation, a clamp-screw tapped into the cap and engaging the head, a runner, and balancing springs connecting the slide to the runner, substantially as specified.

3. A spring scale comprising a housing having a back plate provided with a vertical hollow rib, a runner within the housing, a cylinder within the hollow rib, a plunger engaging the cylinder, and means for operatively connecting the plunger with the runner, substantially as specified.

Signed by me at New York city, (Manhattan,) N. Y., this 30th day of April, 1908.

CHARLES SIRCH.

Witnesses:
 HERMAN ZILLICH,
 FRANK V. BRIESEN.